Nov. 23, 1948.  D. R. WERNER  2,454,536
CONTROL APPARATUS FOR FORCED DRAINAGE
Filed May 11, 1944
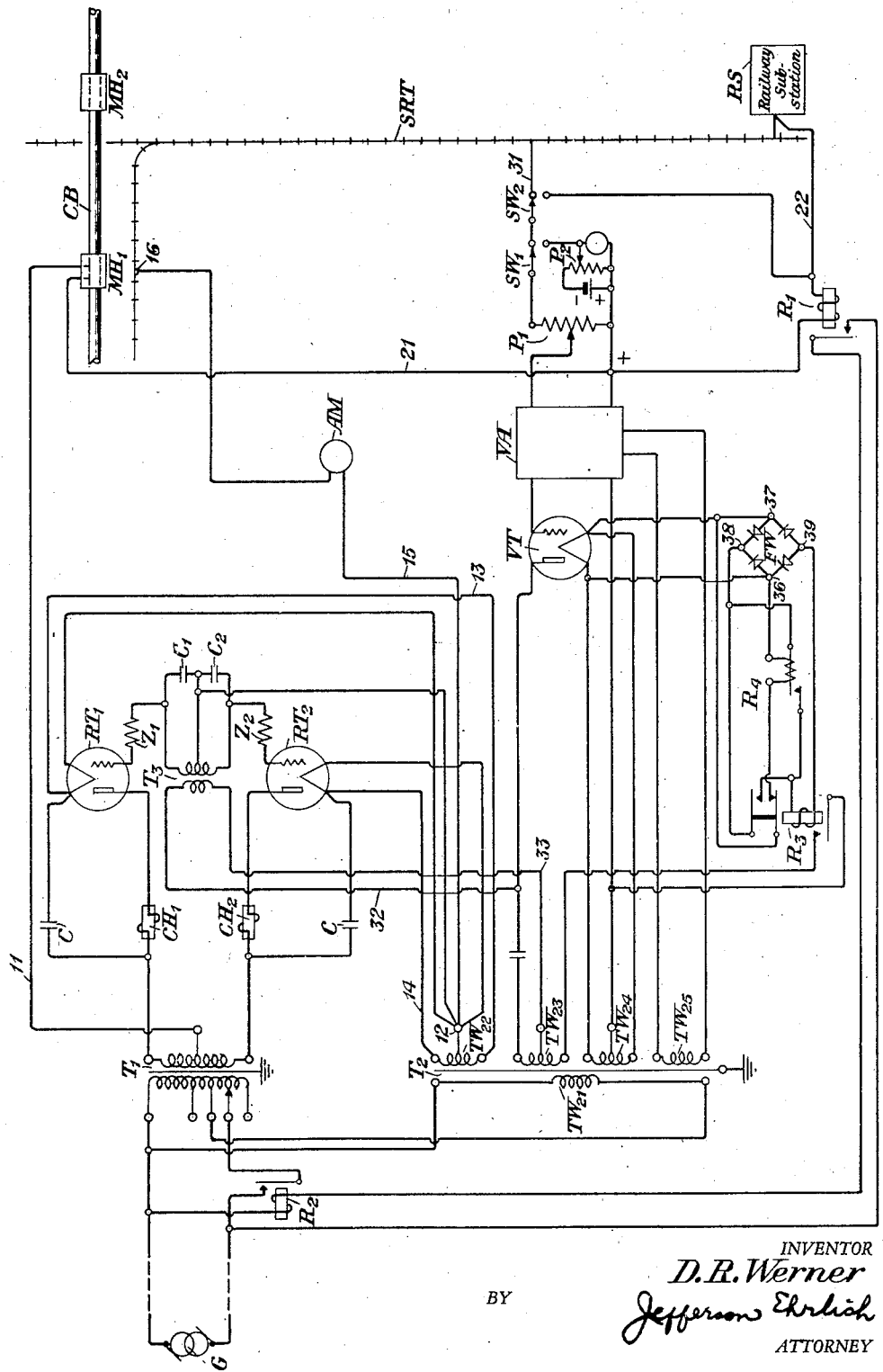
INVENTOR
*D. R. Werner*
BY *Jefferson Ehrlich*
ATTORNEY Patented Nov. 23, 1948

2,454,536

UNITED STATES PATENT OFFICE 2,454,536

CONTROL APPARATUS FOR FORCED DRAINAGE

Daniel Ralph Werner, Omaha, Nebr., assignor to American Telephone and Telegraph Company, a corporation of New York Application May 11, 1944, Serial No. 535,187

4 Claims. (Cl. 171—316)

This invention relates to forced drainage systems and to apparatus or arrangements for reducing or preventing the corrosion of the sheaths of cables which may be exposed to stray currents from electrical circuits employed for power or other services.

It is well known that when an underground telephone cable is exposed to a grounded D. C. power system some of the current of the power system will flow through the ground to the cable sheath. If the resulting voltage on the cable sheath is positive with respect to the earth (anodic condition) the cable sheath may undergo electrolysis at one or more points and may in due course become corroded. This constitutes a menace to the continuity of service over the numerous telephone conductors contained within the cable sheath.

It has heretofore been the practice to connect the cable sheath to a suitable point on the power system by means of a heavy copper wire or other good conductive medium so that the current on the cable sheath will flow from the cable sheath back to the power system over the copper wire or other conductor rather than through the earth, thereby to reduce the corrosive effect upon the cable sheath. If the distance of the cable from a suitable point of connection to the power system is quite large, the amount of wire required for the drainage system may be prohibitive, and aside from the cost of the copper wire the expense of installation may be considerable. Such a drainage system is not always the most feasible nor economically the most advantageous solution.

In some cases, in order to reduce over-all costs, it has been the practice to use a drainage wire of smaller size than would ordinarily be required and to compensate for the excess resistance by inserting in series therewith a device for supplying an electromotive force. This arrangement has the inherent disadvantage that the drainage current does not vary in direct relationship with the need for protection but contains a constant component of current which is a function of the circuit resistance and the E. M. F. of the device employed. This results in a waste of electrical power and in some cases may react unfavorably on other underground structures not so protected.

It is therefore proposed to incorporate in a drainage system a device which is capable of supplying an E. M. F. together with an arrangement for controlling the drainage current in accordance with actual protection requirements.

The drainage apparatus of the invention will be shown to include a full-wave rectifier which will supply current for drainage purposes whenever the cable sheath becomes positive with respect to earth. However, the drainage system will be arranged so that whenever the cable sheath has a negative potential to earth (cathodic condition) the flow of current will be interrupted. Moreover, the drainage apparatus will be shown to include a circuit for the control of the amount of rectified current supplied for drainage purposes in accordance with the magnitude of the positive potential on the cable sheath. Thus, when the positive potential on the cable sheath increases, the rectified current transmitted for drainage purposes will be increased, and conversely, as its positive potential is reduced, the drainage current will likewise become reduced.

This invention will be better understood from the more detailed description hereinafter following, when read in connection with the accompanying drawing showing one embodiment of the invention merely for illustrative purposes.

Referring to the drawing, a railway substation RS is shown connected to street railway trackage SRT for supplying power to the street cars (not shown) that are to be operated over the trackage SRT. A telephone cable CB is exposed to the power circuit which includes the trackage SRT, and in the illustration, part of the cable is shown crossing the trackage SRT at one point and running parallel to one of the legs of the trackage for a considerable distance. The cable CB is, of course, buried in the earth, but it may be reached through manholes such as $MH_1$ and $MH_2$.

The full wave rectifier which is to be used for supplying drainage current may include two triodes $RT_1$ and $RT_2$ of the mercury vapor type, the anodes of which are connected to the opposite terminals of the secondary winding of a transformer $T_1$ through choke coils $CH_1$ and $CH_2$, respectively. The midpoint of the secondary winding of transformer $T_1$ is connected to the sheath of the cable CB by a conductor 11 extending through the manhole $MH_1$. Another transformer $T_2$, the primary winding $TW_{21}$ of which is connected in parallel with the primary winding of transformer $T_1$, has a secondary winding $TW_{22}$, which is employed for energizing the cathodes of the rectifiers $RT_1$ and $RT_2$. It will be observed that the cathode of the rectifier $RT_1$ is connected between the midpoint 12 of the transformer secondary winding $TW_{22}$ and the conductor 13 which extends to the lower terminal of the secondary winding $TW_{22}$. Likewise, the cathode of the rectifier $RT_2$ is connected between the mid-point 12 of the secondary winding $TW_{22}$ and the conductor 14 which extends to the upper terminal of the transformer winding $TW_{22}$. The midpoint 12 of the secondary winding $TW_{22}$ is connected by a conductor 15 to an ammeter AM, which in turn is connected to the point 16 of one leg of the trackage SRT. It will be seen, therefore, that when the primary winding of transformer $T_1$ is supplied with power from a generator such as G, a rectified current will flow through the ground over a path between the sheath of the cable CB and the point 16 of the trackage SRT, this grounded path being part of a circuit which includes the conductor 11 and parallel paths through the upper and lower halves of the winding of the secondary of transformer $T_1$, the choke coils $CH_1$ and $CH_2$, the anode-cathode paths of the rectifiers $RT_1$ and $RT_2$ to the lower and upper halves of the secondary winding $TW_{22}$ of transformer $T_2$, the parallel paths being joined at point 12 so that both portions of the rectified current will reach this point, the rectified current then continuing over the remainder of the circuit including conductor 15, through ammeter AM, to point 16 of the trackage SRT. Hence current will flow over the ground path extending from the sheath of the cable CB to point 16 on the trackage SRT and if properly adjusted will render the cable sheath at a negative potential with respect to earth. Such a negative potential will, of course, tend to prevent the corrosion of the cable sheath.

The flow of rectified current through rectifiers $RT_1$ and $RT_2$ may be unnecessary at times of the day when the cable sheath may be at a negative potential or zero potential with respect to earth. Hence the arrangement of this invention contemplates the use of a control circuit to interrupt the flow of the rectified current during such intervals. The control circuit may include a conductor 21 which extends from the sheath of the cable CB, through the manhole $MH_1$ to one terminal of the winding of the relay $R_1$, the other terminal of which is connected by a conductor 22 to the negative bus of the railway substation RS. The relay $R_1$ is preferably a polar relay which will operate only when the cable sheath CB and conductor 21 are at a positive potential with respect to the conductor 22 and the negative bus of the substation RS. At other times relay $R_1$ will be released. When energized the relay $R_1$ will close a circuit connecting a relay $R_2$ to the generator G to energize the relay $R_2$. The relay $R_2$ is preferably of the alternating current type, and when energized its armature closes a circuit connecting the generator G to the primary winding of the transformer $T_1$. Unless both relays $R_1$ and $R_2$ are operated, there will be no flow of current from generator G through transformer $T_1$ to the full-wave rectifier system $RT_1$—$RT_2$ to supply drainage current between the trackage SRT and the sheath of the cable CB.

In addition to the control of the connection of the full wave rectifier system to the source of power for supplying drainage current as already noted, there is a second control circuit for regulating the amount of current that may be supplied for drainage purposes. This second control circuit may include a conductor 31 which is connected to the trackage SRT and a potentiometer $P_1$, the lower terminal of which is connected to the conductor 21 and therefore to the cable sheath, and the upper terminal of potentiometer $P_1$ is connected to conductor 31 through switches $SW_1$ and $SW_2$. The potentiometer $P_1$ may be adjusted to apply any portion of the voltage between the sheath of the cable CB and the trackage SRT to a voltage amplifier VA of any well known type. The voltage amplifier VA may be of any well known type, its filament circuit (not shown) being supplied with the required heating current by the secondary winding $TW_{25}$ of transformer $T_2$ and its output voltage being applied between the grid and cathode of another tube VT for further control of the applied voltage. The cathode of the tube VT is connected directly across the winding $TW_{24}$ of transformer $T_2$. The midpoint of the secondary winding $TW_{24}$ completes the path to the output circuit of the voltage amplifier VA.

The output electrodes of the tube VT are connected to the primary winding of the transformer $T_3$ over a circuit which includes the anode of tube VT, conductor 32, the primary winding of transformer $T_3$, the conductor 33, the lower half of the secondary winding $TW_{23}$ of transformer $T_2$, the lower make contact and armature of relay $R_3$, back to the cathode of tube VT, through the two halves of winding $TW_{24}$. The secondary winding of transformer $T_3$ is connected to the grid electrodes of the rectifiers $RT_1$ and $RT_2$ through resistors $Z_1$ and $Z_2$, respectively. Equal condensers $C_1$ and $C_2$ are bridged across the upper and lower halves of the secondary winding of transformer $T_3$.

When the positive potential on the sheath of cable CB drops in magnitude, there will be a reduced voltage across potentiometer $P_1$. This will result in a decrease in the negative bias applied to the voltage amplifier VA which therefore increases its anode current. This will permit a smaller current to flow in the plate circuit of tube VT. This is equivalent to increasing the anode to cathode resistance of tube VT. It is observed that the anode circuit of tube VT is directly coupled to transformer $T_3$ which is connected to the grids of rectifier tubes $RT_1$ and $RT_2$. Hence, any change in the current of the plate circuit of tube VT (or in its resistance) will shift the phase relation of the grid voltage applied to rectifier tubes $RT_1$ and $RT_2$ with respect to the A. C. voltage applied through transformer $T_1$ to the anodes of tubes $RT_1$ and $RT_2$. This change in phase relationship will change the firing points of the rectifier tubes $RT_1$ and $RT_2$, thereby varying the rectified current supplied for drainage purposes. As the positive voltage of the sheath of the cable CB increases, the phase of the regulating voltage applied to the grids of the tubes $RT_1$ and $RT_2$ will likewise increase and will cause an increased current to flow through rectifiers $RT_1$ and $RT_2$. In that case the drainage current traversing meter AM will show an increased reading and the increased current will be transmitted through the ground between the trackage SRT and the sheath of the cable CB to maintain the cable sheath increasingly negative under such conditions. As the magnitude of the potential on the cable sheath is reduced, on the other hand, the phase of the voltage supplied by voltage amplifier VA and tube VT will likewise be reduced, and hence the rectified currents traversing rectifiers $RT_1$ and $RT_2$ will become diminished. Hence a smaller current will traverse the ground between the trackage SRT and the sheath of the cable CB. This is an important feature of the regulated drainage system of this invention.

A timing circuit is also included in the arrangement of this invention for delaying the application of control voltage to rectifiers $RT_1$ and RT₂ from the voltage amplifier VA and tube VT for a brief time interval. The time delay circuit is for the purpose of allowing the cathodes of tubes RT₁ and RT₂ to reach normal operating temperature before the tubes are allowed to pass current between their respective anodes and cathodes to prevent damage to the tubes. This delay circuit includes a full-wave rectifier FW which is shown with its input terminals 36 and 37 connected across the secondary winding TW₂₄ of the transformer T₂. The input terminals 36 and 37 are connected through a delay relay R₄ over a circuit which includes the terminal 36 of the full-wave rectifier FW, the winding of the relay R₄, the back contact and upper inner armature of relay R₃ and terminal 37 of the full-wave rectifier FW. When relay R₄ operates, it closes a circuit connecting the winding of relay R₃ to the output terminals 38 and 39 of the rectifier FW, this circuit including terminal 38, the armature and make contact of relay R₄, the winding of relay R₃ and terminal 39. The relay R₃ will therefore be operated only after the delay relay R₄ has been operated. The lower armature and make contact of relay R₃ are connected in the circuit which regulates the amount of rectified current traversing rectifiers RT₁ and RT₂, as already noted hereinabove. After relay R₃ operates, it will be locked in its operated position by a circuit which includes terminal 38 of rectifier FW, the upper outer armature and make contact of relay R₃, the winding of relay R₃ and terminal 39 of the rectifier FW. The operation of relay R₃ will remove current from the winding of relay R₄ by opening the circuit in series therewith at the back contact of the upper inner armature of relay R₃, and hence relay R₄ will be released. Although relay R₄ remains released, relay R₃ will remain operated as long as power is supplied to the full-wave rectifier FW from the transformer T₂, and this will depend upon whether or not the relay R₂ is operated.

The control apparatus may be adjusted by operating switch SW₁ to its lower position. A potentiometer P₂ may then apply any desired potential to potentiometer P₁ which in turn will fix the magnitude of the rectified current supplied for drainage purposes. It is thus possible to adjust the arrangement to provide any predetermined value of rectified current for drainage purposes and to vary the magnitude of the rectified current within any desired limits. By operating switch SW₂ to its lower position, a higher potential may be applied to potentiometer P₁ and at the same time the arrangement may be used to determine the magnitude of the voltage applied to polar relay R₁.

While this invention has been shown and described in certain particular embodiments merely for the purpose of illustration, it will be understood that the general principles of this invention may be applied to other and widely varied organizations without departing from the spirit of the invention as defined in the appended claims.

What is claimed is:

1. Apparatus for maintaining an underground cable sheath at a negative potential with respect to a grounded power circuit, comprising a regulatable rectifier for supplying direct current through the ground over a path between said grounded power circuit and said cable sheath, said regulatable rectifier including an electron discharge tube having an anode, a cathode and a control electrode, and means responsive to the changes in the voltage between the cable sheath and said grounded power circuit to act on said control electrode to regulate the magnitude of said rectified direct current to maintain said cable sheath at a negative potential.

2. A forced drainage system for preventing corrosion of an underground cable sheath which is exposed to currents from a grounded power circuit, comprising a full wave rectifier for supplying direct current through the ground over a path between the grounded power circuit and said cable sheath to reduce the positive potential of said cable sheath with respect to ground potential, and means for interrupting the flow of said rectified current when the potential of said cable sheath becomes negative with respect to said grounded power circuit.

3. A forced drainage system for preventing corrosion of an underground cable sheath which is exposed to currents from a grounded power circuit, comprising two grid-controlled discharge tubes arranged as a full wave rectifier, means for conducting current rectified by said rectifier through the ground to substantially neutralize any potential on said cable sheath which is positive with respect to earth, means responsive to the absence of a positive potential on said cable sheath to interrupt the flow of said rectified current, and further means for regulating the bias of the grids of said discharge tubes to control the magnitude of the rectified current in accordance with the magnitude of the positive potential on said cable sheath.

4. Apparatus for preventing corrosion of an underground cable sheath which is exposed to currents from a grounded power circuit, comprising a rectifier, a circuit including said rectifier for transmitting rectified current through the ground over a path between said power circuit and said cable sheath, means for regulating the magnitude of the rectified current in accordance with the changes in voltage between said cable sheath and said power circuit, and means for interrupting said rectified current when the potential of said cable sheath becomes negative with respect to said grounded power circuit.

DANIEL RALPH WERNER.

REFERENCES CITED

The following references are of record in the file of this patent:

UNITED STATES PATENTS

| Number | Name | Date |
|---|---|---|
| 1,010,907 | Hayden | Dec. 5, 1911 |
| 1,191,611 | Potter | July 18, 1916 |
| 1,904,569 | Tebo | Apr. 18, 1933 |
| 2,179,794 | Loy | Nov. 14, 1939 |